US009380915B2

(12) United States Patent
Sabounjian (10) Patent No.: US 9,380,915 B2
(45) Date of Patent: Jul. 5, 2016

(54) TRAY WITH ADJUSTABLE DIVIDERS (71) Applicant: Pro-Mart Industries, Inc., Irvine, CA (US)

(72) Inventor: Azad Sabounjian, Irvine, CA (US)

(73) Assignee: Pro-Mart Industries, Inc., Irvine, CA (US)

(*) Notice: Subject to any disclaimer, the term of this patent is extended or adjusted under 35 U.S.C. 154(b) by 0 days.

(21) Appl. No.: 14/548,084

(22) Filed: Nov. 19, 2014

(65) Prior Publication Data
US 2015/0136718 A1 May 21, 2015

Related U.S. Application Data (60) Provisional application No. 61/906,778, filed on Nov. 20, 2013.

(51) Int. Cl.
| *A47B 88/20* | (2006.01) |
| *A47J 47/16* | (2006.01) |
| *A47J 31/44* | (2006.01) |
| *A47J 31/36* | (2006.01) |

(52) U.S. Cl.
CPC .............. *A47J 47/16* (2013.01); *A47B 88/20* (2013.01); *A47J 31/3642* (2013.01); *A47J 31/44* (2013.01); *A47B 2088/202* (2013.01)

(58) Field of Classification Search
CPC ... A47J 47/16; A47B 88/20; A47B 2088/202; A47B 2088/205; A47B 2088/207
USPC .............. 312/348.3; 224/42.33; 211/126.13
See application file for complete search history.

(56) References Cited

U.S. PATENT DOCUMENTS

| 691,177 | A | * | 1/1902 | Rand ..................... | B42F 17/00 |
| | | | | | 211/126.13 |
| 1,052,516 | A | * | 2/1913 | Ringer ................... | A47B 57/16 |
| | | | | | 108/109 |
| 1,523,136 | A | | 1/1925 | O'Conner | |
| 1,677,544 | A | * | 7/1928 | Gourley ................. | A47B 88/20 |
| | | | | | 211/184 |
| 1,712,177 | A | | 5/1929 | Duthie-Strachan | |
| 1,893,186 | A | * | 1/1933 | Thomas, Jr. ........... | A47B 88/20 |
| | | | | | 211/184 |
| 1,940,048 | A | * | 12/1933 | Cutler .................... | A47B 88/20 |
| | | | | | 211/184 |
| 2,233,938 | A | * | 3/1941 | Jones ..................... | B42F 17/02 |
| | | | | | 220/529 |
| 2,507,366 | A | * | 5/1950 | Budal .................... | A47B 88/20 |
| | | | | | 206/561 |
| 2,586,925 | A | | 2/1952 | Drengberg | |
| 2,610,759 | A | | 9/1952 | Slade | |
| 2,695,112 | A | | 11/1954 | Bonnevay | |
| 2,956,675 | A | * | 10/1960 | Bates ..................... | A47B 88/20 |
| | | | | | 206/449 |
| 2,985,333 | A | | 5/1961 | Kirkman | |

(Continued)

*Primary Examiner* — Michael Safavi
(74) *Attorney, Agent, or Firm* — Stetina Brunda Garred & Brucker; Lowell Anderson (57) ABSTRACT

A rectangular coffee pod tray has two opposing end walls, two opposing sidewalls, a closed bottom and an open top. One end wall has plurality of first slots at predetermined locations and the other end wall has a plurality of second slots. The first and second plurality of slots are aligned to form pairs of corresponding slots so a divider placed into corresponding first and second slots is parallel to a longitudinal axis of the tray. The slots have a top that widens at the bottom of the slot and that is deeper into the end wall at the bottom of the slot for easy insertion and removal. Differing number of rectangular dividers fit into the specially located slots to form rows for four different sized coffee pods. The dividers may have tapered ends to fit into the slots, and a tapered bottom to fit into grooves in the bottom of the tray.

24 Claims, 7 Drawing Sheets

(56) References Cited

U.S. PATENT DOCUMENTS

| | | | | |
|---|---|---|---|---|
| 3,029,357 A * | 4/1962 | Williams | A47B 88/0029 | 220/4.03 |
| 3,241,900 A * | 3/1966 | Hamilton | A47B 17/003 | 220/532 |
| 3,954,202 A * | 5/1976 | Petrick | A47B 88/20 | 220/533 |
| 4,234,089 A * | 11/1980 | Morris | B65D 25/107 | 206/456 |
| 4,261,465 A | 4/1981 | Thomas | | |
| 4,443,046 A * | 4/1984 | Hannah | A47B 21/03 | 211/50 |
| 4,573,731 A * | 3/1986 | Knaack | B60R 11/06 | 224/404 |
| 4,832,241 A * | 5/1989 | Radcliffe | B60R 7/043 | 108/44 |
| 4,909,399 A | 3/1990 | Dyrhood et al. | | |
| 4,944,544 A * | 7/1990 | Dick | B60R 7/02 | 224/542 |
| 5,054,668 A * | 10/1991 | Ricchiuti | B60R 7/02 | 206/818 |
| 5,094,375 A * | 3/1992 | Wright | B60R 7/02 | 224/404 |
| 5,103,998 A | 4/1992 | Caro et al. | | |
| 5,167,433 A * | 12/1992 | Ryan | B60R 13/01 | 220/533 |
| 5,215,205 A * | 6/1993 | Behlman | B60R 7/02 | 220/4.31 |
| 5,265,729 A | 11/1993 | Carlin | | |
| 5,299,688 A | 4/1994 | McKay et al. | | |
| 5,381,940 A | 1/1995 | Wright | | |
| 5,469,999 A * | 11/1995 | Phirippidis | B60R 7/02 | 220/23.4 |
| 5,553,710 A * | 9/1996 | Takama | A47B 88/20 | 206/561 |
| 5,603,439 A * | 2/1997 | Pineda | B60R 7/02 | 224/281 |
| 5,651,596 A | 7/1997 | Carlson et al. | | |
| 5,887,712 A * | 3/1999 | Jenkins | G11B 33/0461 | 206/307.1 |
| 5,931,632 A * | 8/1999 | Dongilli | B60R 9/00 | 224/404 |
| 6,085,932 A | 7/2000 | Cope | | |
| 6,279,744 B1 | 8/2001 | Yu | | |
| 6,443,544 B1 * | 9/2002 | Wolf | A47B 88/20 | 312/263 |
| 7,363,936 B1 | 4/2008 | Simoneaux et al. | | |
| 7,506,757 B1 | 3/2009 | Ater et al. | | |
| 8,727,457 B2 * | 5/2014 | Marshall | A47B 88/20 | 211/184 |
| 8,814,246 B2 * | 8/2014 | Weller | B60R 9/00 | 296/100.08 |
| 8,833,881 B2 * | 9/2014 | Manniso | A47B 88/20 | 211/10 |
| 8,960,824 B2 * | 2/2015 | Wilcox | F25D 25/025 | 312/348.3 |
| 2002/0137368 A1 * | 9/2002 | Sumida | B60R 16/0239 | 439/76.2 |
| 2003/0227241 A1 * | 12/2003 | LaBonia, Jr. | A47B 88/20 | 312/348.3 |
| 2005/0264147 A1 * | 12/2005 | Norris | A47B 88/20 | 312/348.3 |
| 2007/0131632 A1 * | 6/2007 | Brown | A47B 87/0261 | 211/126.13 |
| 2008/0258593 A1 * | 10/2008 | Berger | A47B 88/20 | 312/348.3 |
| 2011/0084584 A1 * | 4/2011 | Curtin | A47B 97/20 | 312/348.3 |
| 2012/0262043 A1 * | 10/2012 | Lechert, Jr. | A47B 88/20 | 312/348.3 |
| 2012/0319550 A1 * | 12/2012 | Manniso | A47B 88/20 | 312/348.3 |
| 2013/0307394 A1 * | 11/2013 | Dondurur | A47B 88/20 | 312/348.3 |
| 2014/0367436 A1 * | 12/2014 | Fleet, Sr. | B62R 7/02 | 224/522 |

* cited by examiner

TRAY WITH ADJUSTABLE DIVIDERS

CROSS-REFERENCE TO RELATED APPLICATIONS

The application claims the benefit under 35 U.S.C. §119(e) to Provisional Patent Application No. 61/906,778 filed Nov. 20, 2013, the entire contents of which are incorporated herein by reference.

BACKGROUND

The present invention relates generally to containers for single serve coffee containers or coffee pods. Different types of single serve coffee makers are sold that use containers holding just enough coffee for an individual serving. The shape of the containers varies with the coffee maker. The coffee containers, or coffee pods come in various sizes and are usually sized to hold about 9-11 grams of coffee to make a serving of about 8 ounces. The coffee pods have circular tops or generally circular tops (to accommodate side spouts or tabs) and have slightly tapered, cylindrical sides and usually a generally flat or slightly conical bottom. The coffee pods have different diameter tops which extend a few mm outward from the largest opening of the body, with the body tapering slightly to the bottom. The diameters of the coffee containers or pods vary and the containers typically have outwardly extending lips or flanges that can add about half a centimeter to the diameter. The body diameter is about 4 cm for NESPRESSO® and MELITTA® coffee pods, about 4.5 cm for standard KEURIG® and STARBUCKS® coffee pods and JUAN VALDEZ® brewers, about 5 cm diameter for NESTLE® coffee pods, about 5 cm for KEURIG® VUE® coffee pods and about 6 cm in diameter for MAXWELL HOUSE brewers with TASSIMO® coffee pods. The body of these coffee pods is usually shorter vertically than the diameter at the top of the coffee pod and the body vertical height is usually longer than the diameter at the bottom of the coffee pod. The one notable exception to these very general dimensional relationships is the MAXWELL HOUSE® coffee pod which is more like a shallow disc about 1 cm deep 6 cm in diameter.

The single serve coffee makers are typically placed on top of a counter or on top of a stand which rests on the counter. The stand usually has coffee pods for use with the coffee maker. To better organize the coffee pods stands may be provided with a drawer that may be slid part way out of the stand, with dividers to hold the coffee pods in rows for more organized access and to better track consumption and plan for replacement. But because the coffee pods vary in size and shape it may be difficult to have a stand with a drawer to accept the size of individual coffee container that is used and keep them organized in orderly rows. There is thus a need for a coffee stand that can accommodate a variety of different sized, individual coffee containers or coffee pods. Because coffee often spills onto the drawers holding the coffee pods in these stands, there is a similar need for a light weight tray or drawer that is easy to remove and clean and that can accommodate a variety of different size, individual coffee pods.

BRIEF SUMMARY

A rectangular tray is provided with two opposing end walls, two opposing sidewalls, a closed bottom and a top that is preferably open. One end wall has plurality of first slots at predetermined locations and the other end wall has a plurality of second slots. The first and second plurality of slots are aligned to form pairs of corresponding slots so a divider placed into corresponding first and second slots is parallel to a longitudinal axis of the tray. The slots have a top that widens at the bottom of the slot, and that also extends deeper into the end wall at the bottom of the slot, in order to make it easier to insert the dividers into the slots and to remove them. Differing numbers of rectangular dividers fit into the slots to form rows of differing number and width to hold commonly sized coffee pods. The dividers may have tapered ends to fit into the slots, and a tapered bottom to fit into grooves in the bottom of the tray. The slot spacing is selected to accommodate the more common coffee pod sizes so a single tray can be reconfigured by a user to hold different coffee pod sizes in rows.

In more detail, there is provided a coffee pod tray having repositionable dividers. The tray has a rectangular shape with two opposing end walls joined to two opposing sidewalls, a closed bottom and a top that is preferably open. One end wall has a plurality of first slots at predetermined locations and the other end wall having a plurality of second slots at predetermined locations. The first and second plurality of slots are aligned with each other to form pairs of corresponding slots so that a divider placed into corresponding first and second slots is generally parallel to a longitudinal axis of the tray. The slots have a top end adjacent the open top of the tray and a bottom end adjacent the closed bottom of the tray. The slots have a width measured generally parallel to the bottom of the tray and perpendicular to the longitudinal axis, with the width being larger at the bottom than at the top. The tray also has a plurality of generally rectangular dividers having a length slightly greater than a distance between the interior surfaces of the two opposing end walls and selected to fit into two aligned and corresponding slots.

In further variations, the tray also has the slots extend into the end wall a depth that increases as the slot approaches the bottom of the tray. The dividers may have opposing ends that are tapered to fit within the slots. The bottom of the tray may have a plurality of grooves generally parallel to the longitudinal axis with each groove extending along the bottom between a different pair of aligned and corresponding slots. The dividers may also have a bottom edge that is tapered to fit into those grooves.

The coffee pod tray may be preferably configured for specific coffee pod arrangements. The tray may have two dividers each placed into corresponding and aligned slots located so that the dividers and side walls define three rows parallel to the longitudinal axis, the three rows having a width of about 6 cm. Alternatively, the tray may have three dividers each placed into corresponding and aligned slots located so that the dividers and side walls define four rows parallel to the longitudinal axis, the rows having a width of about 5 cm. The tray may have four dividers each placed into corresponding and aligned slots located so that the dividers and side walls define five rows parallel to the longitudinal axis, the rows having a width of about 4.5 cm. The tray may also have five dividers each placed into corresponding and aligned slots located so that the dividers and side walls define six rows parallel to the longitudinal axis, the rows having a width of about 4 cm. The tray may also have three dividers each placed into corresponding and aligned slots located so that the dividers and side walls define four rows parallel to the longitudinal axis with different spacing between the rows such that the rows have widths of about 6 cm, 5 cm, 4 cm and 5 cm, to receive TASSIMO®, DOLCE GUSTO®, NESPRESSO® and KEURIG® coffee pods.

In a preferred embodiment, the tray may include a first pair of corresponding slots located along the longitudinal axis through a middle of the end walls. A second and third pair of corresponding slots is located on opposing sides of the longitudinal axis at a distance of about one inch mm from the longitudinal axis. A fourth and fifth pair of corresponding slots may be located on opposing sides of the longitudinal axis at a distance of about 1.7 inches (4.3 cm) from the longitudinal axis. A sixth and seventh pair of corresponding slots may be located on opposing sides of the longitudinal axis at a distance of about 2.5 inches (6.4 cm) from the longitudinal axis. An eighth and ninth pair of corresponding slots may be located on opposing sides of the longitudinal axis at a distance of about 3.3 inches (7.6 cm) from the longitudinal axis. Dividers may be placed in any combination of these slots, including the above defined combinations of slots and divider arrangements and spacing's.

There is also provided a kit for a coffee pod tray that includes the above defined tray and its variations, and a plurality of dividers. There are preferably from three to six dividers, and more preferably two to five dividers in the kit so that from three to six rows can be formed, with one or more dividers unused depending on the configuration selected by the user. The unusual combination of spacing on the ends of the tray for the dividers allows these various combinations.

BRIEF DESCRIPTION OF THE DRAWINGS

These and other features and advantages of the invention will become more apparent in light of the following discussion and drawings, in which like numbers refer to like parts throughout, and in which:

FIGS. 26a, 26b are a perspective view and side view of a NESCAFE® container;

FIG. 27 is a perspective view showing the bottom of a NESPRESSO container;

FIG. 28 is a top plan view of a tray with five dividers defining six rows of substantially the same width with containers of FIG. 26 shown in the rows with the top of the containers resting on the bottom of the tray;

DETAILED DESCRIPTION

Referring to FIGS. 1-10, a tray 10 is shown, preferably having a rectangular shape with two opposing end walls 12, 14 and two opposing side walls 16a, 16b which are preferably longer than the end walls. A tray bottom 18 is preferably joined to the side walls 16 and end walls 12, 14 to form a contained volume with an open top. The end walls 12, 14 have a plurality of correspondingly located slots 20 extending generally vertically from the open top edge of the side wall to the closed bottom edge of the side wall. In the depicted embodiment there are eleven slots, 20a through 20k. A plurality of dividers 22 are provided that have opposing ends 22 configured to fit within opposing pairs of slots. Thus a divider 22 may fit within corresponding and aligned slots 20a in each end wall 14, 16, or fit within the corresponding and aligned in slots 20b in each end wall 14, 16, etc. Depending on which slots the dividers 20 are placed into the distance between the slots varies. The part number assigned to a divider 22 in the drawings refers to the generic divider 22 or to the specific divider in a slot in which case the drawing is labeled with the divider part number and the slot number, such as divider 22c in slots 20c in FIG. 1.

The number of slots in each end wall 12 is preferably an odd number, with the depicted embodiment showing eleven slots in each end wall 14, 16. Preferably one slot is located along the midline or central, longitudinal axis 26 (FIG. 26), with an equal number of slots on opposing sides of that centrally located slot. In the depicted embodiment, slot 20a is the centrally located slot. Slots 20b are equally spaced on opposing sides of slot 20a. Slots 20c are equally spaced on opposing sides of central slot 20a and located closer to sidewalls 16 than slots 20b. Slots 20d are equally spaced on opposing sides of central slot 20a and located closer to sidewalls 16 than slots 20c. Slots 20e are equally spaced on opposing sides of central slot 20a and located closer to sidewalls 16 than slots 20d. Slots 20f are equally spaced on opposing sides of central slot 20a and located closer to sidewalls 16 than slots 20e and are the closest slots to the sidewalls 16.

The slots 20 are located so that the dividers 22 can be selectively positioned so that if there are n slots on each end wall 12 or 14, then (n−1)/2 dividers can be used to achieve an equal spacing x between adjacent dividers or the sidewall 16 and the adjacent divider. In some figures the dividers are numbered according to the slots 20 into which the dividers are inserted. The slots are preferably located symmetrically on opposing sides of the longitudinal axis 26. Thus, slots 20b are each about one inch (25.4 mm) from centerline 26, on opposing sides, so that the distance x between these slots is about two inches. Slots 20c are each about 1.67 inches (about 49.3 mm) from centerline 26 and central slot 20a. Slots 20d are each about 2.5 inches (about 63.5 mm) from centerline 26 and central slot 20a. Slots may 20f are each about 3.3 inches (about 84.6 mm) from centerline 26 and central slot 20a.

When a separate divider 22 is placed into each pair of corresponding and aligned slots 20b, and 20e, a total of four dividers 22 are used and each divider is spaced about two inches from the adjacent sidewall 16 or divider 22, defining six rows with each row being about two inches wide. In contrast, if five dividers are used and each divider is placed in the previously unused slots 20a, 20c and 20f then the five dividers 22 and end walls 16 cooperate to define six rows each spaced a distance apart of about 1.7 inches (4.3 cm) absent the thickness of the divider. The first set of slots 20b and 20e provide a first spacing, here about 2 inches (5 cm). The second set of slots 20a, 20c and 20f provide a third, smaller spacing, here about 1.7 inches (4.3 cm). This different spacing is very useful for coffee pods 28 as VUE® brand coffee pods 28 that are a little under two inches in diameter and K-CUP® brand coffee pods 28 that are a little under 1.7 inches (4.3 cm) in diameter. Thus, the repositionable dividers 24 allow one tray to hold either type of coffee pod 28. Of course, different dividers 22 could be used or omitted to form rows with x spacing as well as rows with y spacing.

Referring to FIGS. 1 and 5-7, the slots 20 in the end walls 12, 14 extend from the closed bottom 18 to the top of each respective end wall. Each of the slots 20 have a variable width measured along an axis perpendicular to the longitudinal axis 26 and in a plane parallel to the bottom 18. The slots 20 are wider at the bottom of the slot adjacent the bottom 18, than they are at the top of the slot at the top of end walls 12, 14. Preferably the width at the bottom of each slot is about three times the width at the top of the slot and more preferably about twice the width at the top of the slot. Advantageously, the width at the bottom of the slot is about 2 or 3 times the width of the divider 22 at the location where the divider abuts the interior surface of the end wall 12, 14 containing the slot. The width of the slots 20 preferably increases at a constant rate so the slots have the shape of a tall, skinny, isosceles triangle when viewed perpendicular to each end wall 12, 14. The end walls 12, 14 preferably have a constant thickness while the slots 20 have a variable depth that is shallow at the top of each end wall 12, 14 and deeper at the bottom 18 of the tray. The depth of the slots 20 advantageously increases at a constant rate so when viewed along the length of the end wall 12, 14 the slots have the shape of a tall, skinny right triangle. The depth of the slots 20 may be tapered to receive the tapered ends 24 of the dividers into the slots, but the slots are advantageously the same depth into the end wall 12, 14 at a particular location so the slot from the bottom 18. Phrased differently, the width of the slot at a given distance from the bottom 18 is preferably a constant as it extends into the end wall 12, 14 and preferably does not taper.

The downwardly increasing width and downwardly increasing depth of the slots 20 makes it easier to insert the dividers 22 into the slots 20 and since the dividers are repositionable the ease of insertion and removal is more important. It is sometimes difficult to insert the dividers, especially long dividers, while keeping the ends of the divider parallel to the end walls 12, 14. As the long dividers 22 are inserted into the slots 20 the dividers are often skewed so one end of the divider is higher than the other relative to the bottom 18. Having the depth of the slots 22 increase toward the bottom of the slot makes it easier to accommodate that misalignment while still holding the dividers 22 within the slots. The tapered end on each of the dividers 22 also helps with the insertion, especially the initial insertion into the more narrow width of the slots at the top of the end walls 12, 14. During insertion it is difficult to keep the dividers 20 generally parallel to the side walls 16 so that the dividers 22 are often rotated about a local longitudinal axis of the divider generally parallel to axis 26, making it difficult to insert the dividers 22 into slots 20. The variable width of the slots 22 helps accommodate such misalignments. The dividers 22 are preferably made of thin material and have a length several times the height of the divider so the dividers are flexible.

Figure 4:
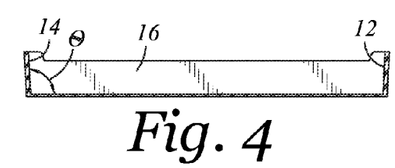
FIG. 4 is a sectional view of the tray taken along section 4-4 of FIG. 3 showing a sidewall of the tray.
Figure 5:
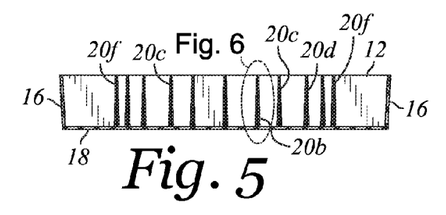
FIG. 5 is a sectional view of the tray taken along 5-5 of FIG. 3 showing an end wall of the tray.
Figure 14:
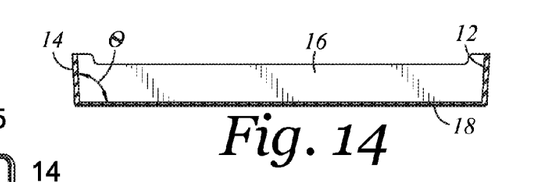
FIG. 14 is a sectional view of the tray taken along section 14-14 of FIG. 13 showing a sidewall of the tray.

The end walls 12, 14 may be slightly inclined outward from an axis orthogonal to the bottom 18 at a slight angle $\theta$ as shown in FIGS. 4, 14, which allows a vertical plug of constant thickness measured along the longitudinal axis, to mold a slot 20 of increasing depth. Preferably though, the angle is small and for mold release.

Figure 7:
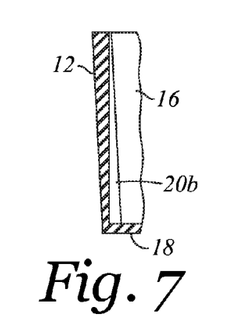
FIG. 7 is a sectional view of a slot in an end wall taken along section 7-7 of FIG. 6.
Figure 15:
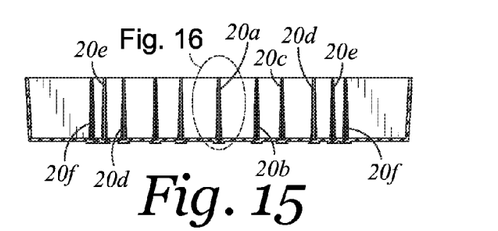
FIG. 15 is a sectional view of the tray taken along section 15-15 of FIG. 13 showing an end wall of the tray.
Figures 16, 17, 18, 19, 20:
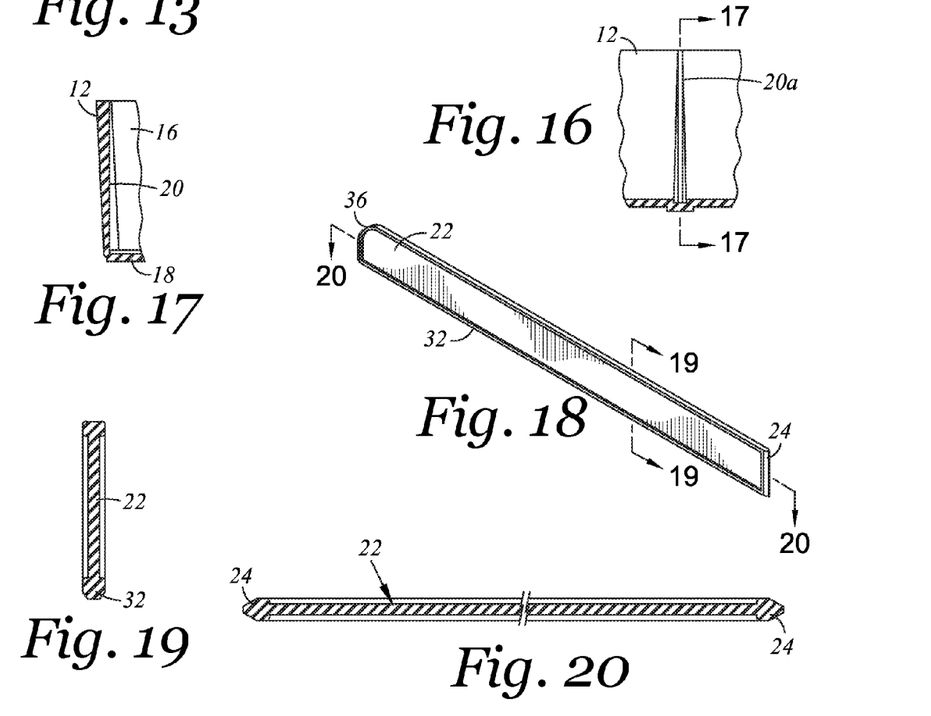
FIG. 16 is an enlarged plan view of a slot in an end wall taken along the indicated area 16 of FIG. 15.
FIG. 17 is a sectional view of a slot in an end wall taken along section 17-17 of FIG. 16.
FIG. 18 is perspective view of a divider of FIG. 11.
FIG. 19 is a cross-section sectional view of the divider of FIG. 18, taken along section 19-19 of FIG. 8.
FIG. 20 is a longitudinal cross-sectional view of the divider of FIG. 18, taken along section 20-20 of FIG. 18.

Dividers 22 made of flexible material such as plastic are preferred and such dividers bend easily about an axis perpendicular to the bottom 18 in the depicted embodiment, especially when moved. The tapered ends on the dividers 22 and the variable depth slots 20 are believed to make it easier to insert such flexible dividers into the slots. Referring to FIG. 15, the dividers 22 should not be too flexible or they will not maintain items in rows between and defined by the dividers. Referring to FIG. 7, in order to make the dividers 22 stiffer and better resist lateral bending from items pushing against the sides of the divider, and to use less material, the dividers may have a cross-sectional shape resembling an I beam with a stiffening rib along the top and bottom edges of the divider.

Referring to FIGS. 9-16, a further embodiment is shown in which the bottom 18 of the tray 10 has longitudinal grooves 30 extending between corresponding slots 20 in the end walls 14, 16. The grooves 30 may have various cross-sectional shapes, with U-shaped cross-sectional shapes preferred over shapes having sharp corners. The grooves 30 preferably have a cross-sectional shape forming an opening at the surface of bottom 18 that is slightly larger than the bottom of the groove. The bottom edge of the divider 22 has a tapered bottom edge 32 as shown in FIG. 15, with the bottom edge 32 configured to fit snugly within the grooves 30. The tapered edge 32 also makes it easier to fit into the groove 30.

Figure 9:
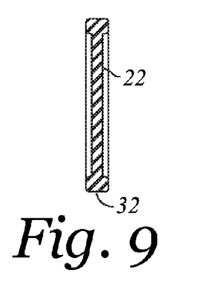
FIG. 9 is a cross-section sectional view of the divider of FIG. 8, taken along section 9-9 of FIG. 8.
Figure 10:
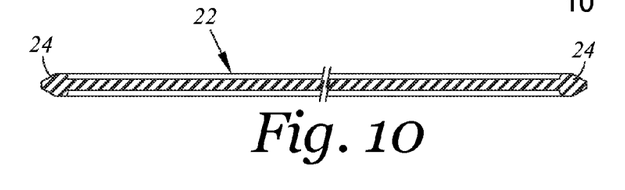
FIG. 10 is a longitudinal cross-sectional view of the divider of FIG. 8, taken along section 10-10 of FIG. 8.
Figure 11:
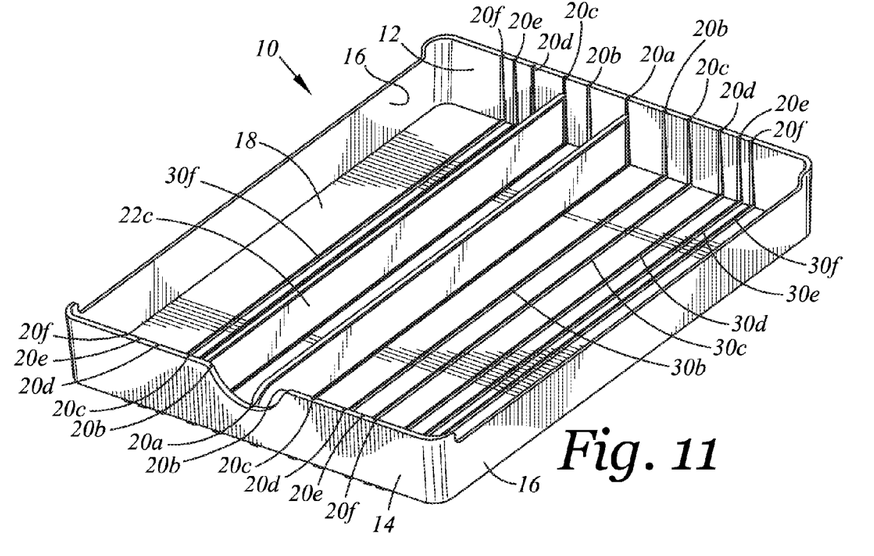
FIG. 11 is a perspective view of a second embodiment of a tray with repositionable dividers, looking down into the inside of the tray, with two dividers shown and a plurality of grooves in the bottom of the tray.
Figure 12:
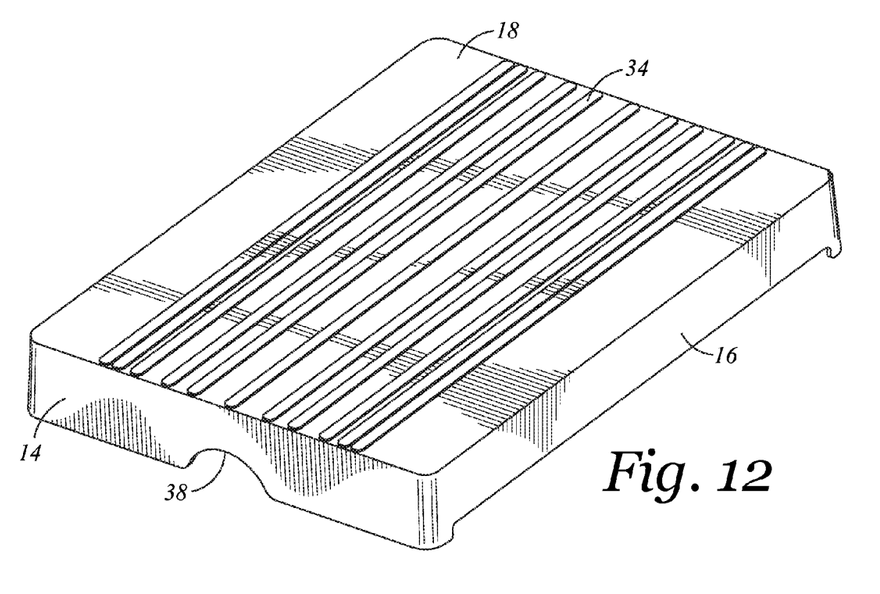
FIG. 12 is a perspective view of the tray of FIG. 11 showing the bottom of the tray.
Figure 13:
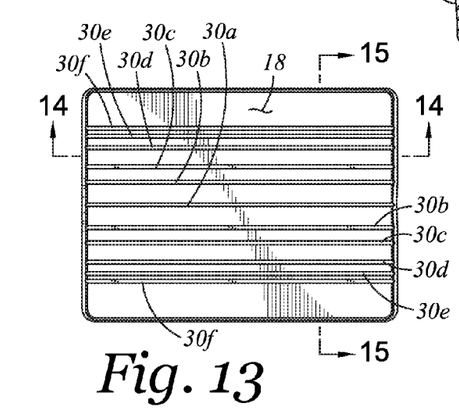
FIG. 13 is a top view of the tray of FIG. 11 but with no dividers in the tray.

Referring to FIGS. 9-11, the grooves reduce the cross-sectional thickness of the bottom 18 if placed in a tray having a bottom 18 of uniform thickness t. Preferably though, the bottom 18 has an undulating surface formed by external ribs 34 extending from the exterior side of the bottom 18 of tray 10, with the ribs 34 corresponding in location to and extending along the length of the grooves 30. The ribs 34 have a height about the same as the depth of groove 32 and have a width sufficient to form sidewalls on the grooves 30 of constant thickness corresponding to the thickness t of the bottom. Thus, the bottom 18 is not weakened by the grooves 18 but is stiffened by ribs 34. The grooves 30 are thus formed on the interior facing surface of the ribs 34.

In use, the dividers 22 have the shaped or tapered bottom edge 32 fit into the grooves 30 to hold the bottom edge of the dividers from moving laterally, while the grooves 30 in the end walls 12, 14 hold the ends of the dividers in place. The grooves 30 are optional. The tapered edge 32 on dividers 22 is optional. But the ribs and grooves are preferred as they are believed to provide a lightweight, strong tray 10.

Figure 1:
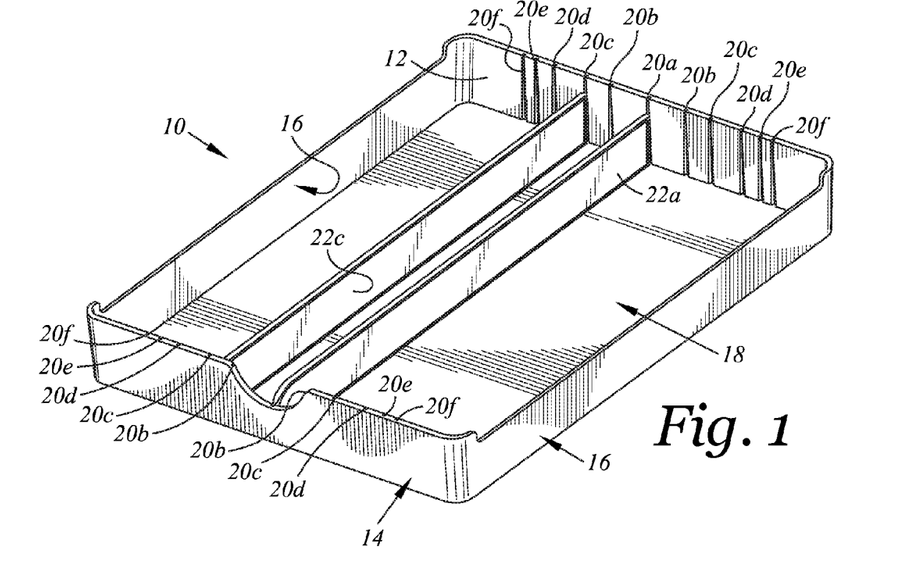
FIG. 1 is a perspective view of a first embodiment of a tray having repositionable dividers and looking down into the inside of the tray, with two dividers being shown.
Figure 2:
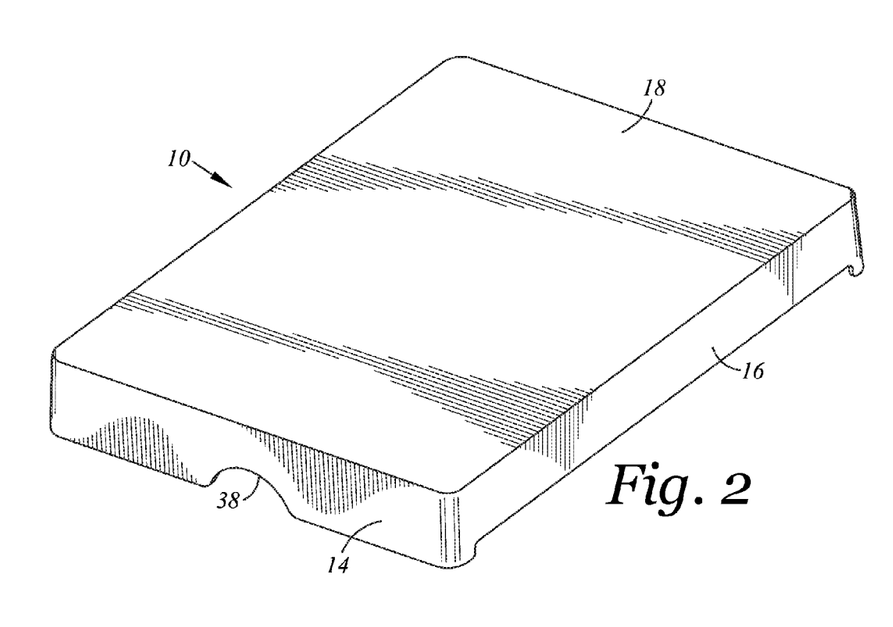
FIG. 2 is a perspective view of the tray of FIG. 1 showing the bottom of the tray.
Figure 3:
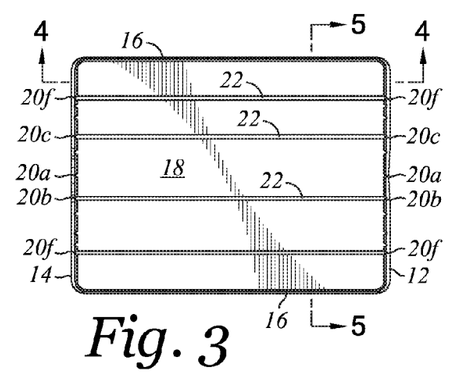
FIG. 3 is a top view of the tray of FIG. 1 with four dividers.
Figures 6, 8:
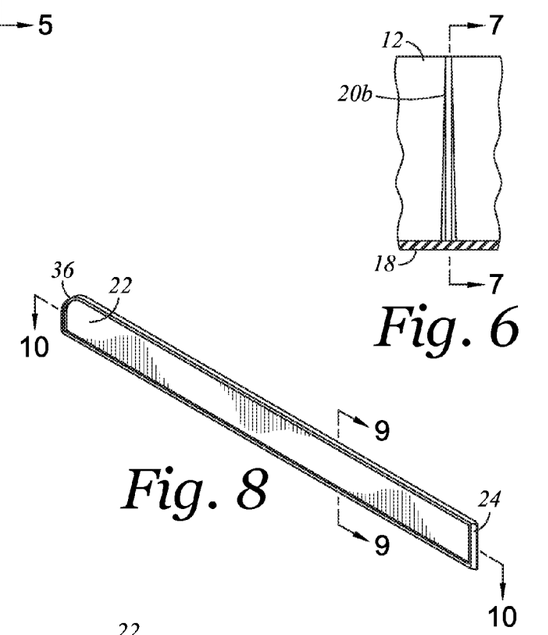
FIG. 6 is an enlarged plan view of a slot in an end wall taken along the indicated area 6 of FIG. 5.
FIG. 8 is perspective view of a divider of FIG. 1.

Referring to FIGS. 6 and 14, the dividers 22 may have all four corners square or may have one upper corner rounded. As shown in FIG. 1, a rounded corner 36 allows more comfortable finger access to recess 38 in the end wall of the tray 10 used to move the tray along longitudinal axis 26. If the corner is sharp, a user's fingers could abut the sharp corner if the divider 22 is located in the recess 38, while a rounded corner 36 helps further avoid any discomfort from abutting the corner 36.

Figure 21:
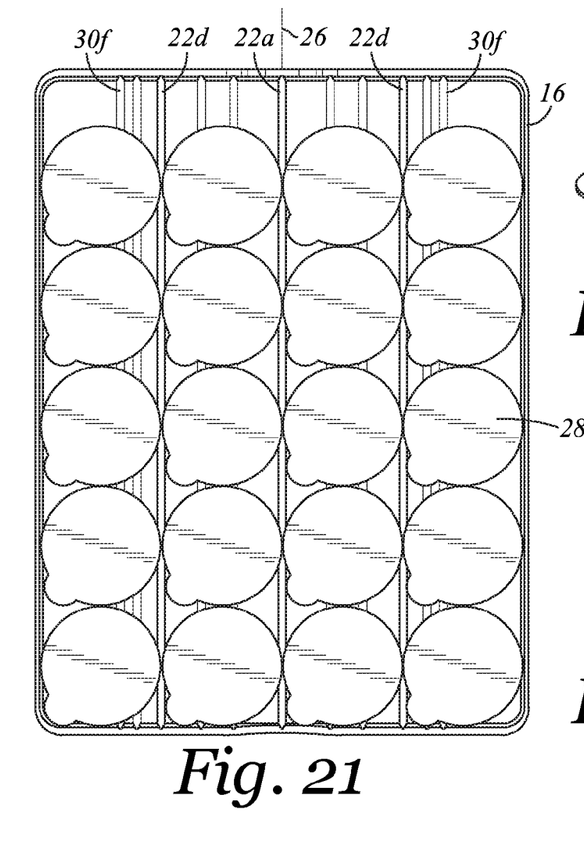
FIG. 21 is a top plan view of a tray with three dividers defining four rows of substantially the same width, suitable for use with a VUE® container.
Figure 22:
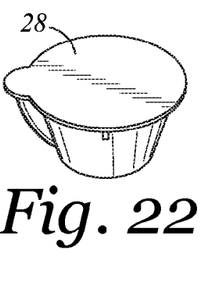
FIG. 22 is perspective view of a VUE® container.

Referring to FIGS. 21-28, the movable or repositionable dividers 22 provide the ability to rearrange the tray 10 to hold different types of coffee pods 28 depending on the type of coffee maker that is used. The more commonly used coffee pods 28 are, in order of size, the NESPRESSO® capsules (FIGS. 27-28) which are the smallest. The DUALT® pods, K-CUP® pods and NESCAFE® dolce gusto containers are roughly the same size, within a few mm (FIGS. 23-26. The VUE® coffee pod is larger (FIGS. 21-22). These coffee pods 28 are all circular in cross-section and have a height about the same as their diameter. In contrast, the TASSIMO® T-DISC® coffee pod 28 has a diameter about 5 times the height. The tray 10 may advantageously have dividers 22 arranged to form rows for each of them.

FIG. 21 shows the dividers 22 placed in three corresponding sets of slots 20a and 22d to form four rows spaced apart a distance sufficient to receive a row each of the VUE® coffee pod 28 shown in FIG. 22. The spacing between divider 22a and the adjacent divider 22d on opposing sides thereof, and the spacing between each of the two dividers 22d and the side 16 of the tray 10 nearest the divider 22d, is about 5 cm. As noted earlier, the divider part numbers correspond to the grooves in which the dividers are located.

Figure 23:
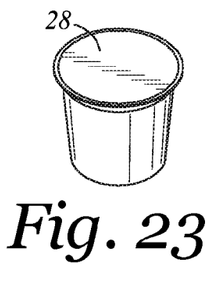
FIG. 23 is a perspective view of a K-CUP container.
Figure 24:
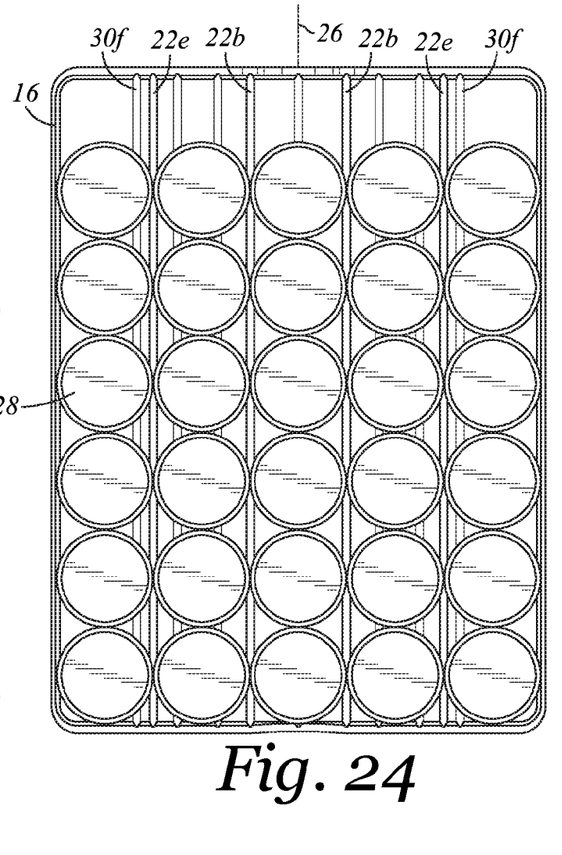
FIG. 24 is a top plan view of a tray with four dividers defining five rows of substantially the same width, suitable for use with K-CUP containers of FIG. 23.

FIG. 23 shows a K-CUP coffee pod while FIG. 24 shows four dividers 22 arranged to hold five rows of K-CUP coffee pods. FIG. 24 shows two dividers 22b and two dividers 22e. Again, the divider part numbers correspond to the grooves in which the dividers are located. The spacing between the adjacent dividers 22b and 22e, or the end dividers 22e and the sides 16, is about 5 cm.

Figure 25:
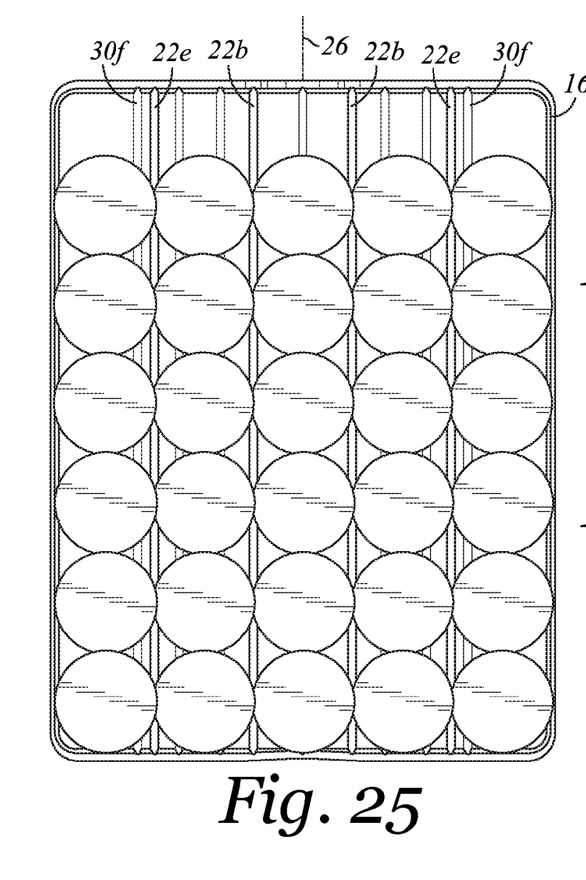
FIG. 25 is a top plan view of a tray with four dividers defining five rows of substantially the same width, suitable for use with NESCAFE® containers of FIG. 26.
Figures 26B, 27, 28:
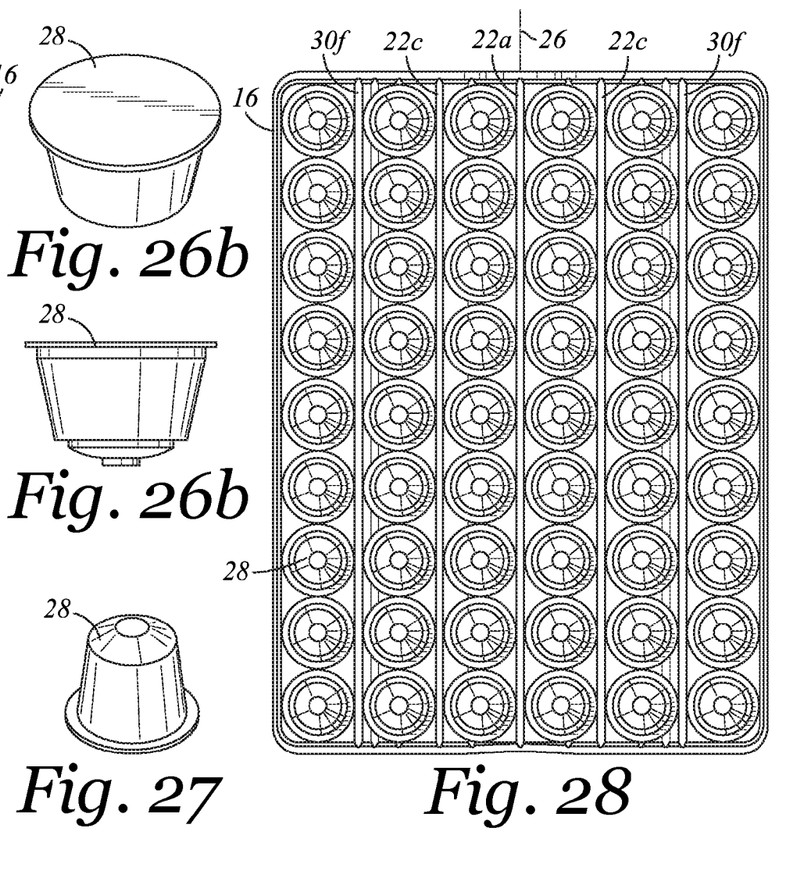

FIG. 25 shows a tray with four dividers and five rows of NESCAFE® coffee pods 28 (FIGS. 26a, 26b). There are two dividers 22b and two dividers 22e, with the divider numbers corresponding to the grooves in which they are located. The spacing between adjacent dividers 22b, or dividers 22b and 22e, or between the outermost dividers 22e and the nearest side 16, is about 5 cm. The tops overlap a bit on the top of the dividers 22 but the bodies fit between the dividers.

FIG. 28 shows a tray with five dividers and six rows of NESPRESSO® capsules (FIG. 27). There are two dividers 22f in grooves 30f (not shown in FIG. 28) and two dividers 22c in two grooves 30c (not shown in FIG. 28), and one divider 22a in groove 30a (not shown in FIG. 28). The spacing between the dividers 22a and 22c, and the spacing between dividers 22c and 22f, and the spacing between the end dividers 22f and the adjacent side wall 16, is about 4 cm.

Figure 29:
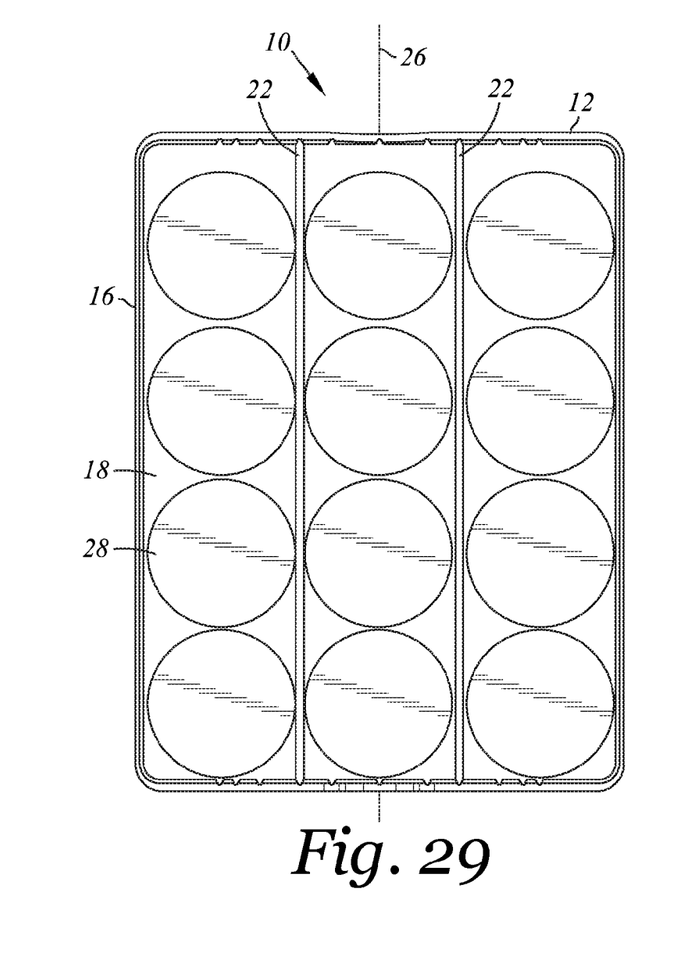
FIG. 29 is a top plan view of a tray with two dividers defining three rows of different width.

FIG. 29 shows a tray with two dividers and three rows of TASSIMO® T-DISC® coffee pods. The dividers 22 are spaced about 6 cm apart.

Figure 30:
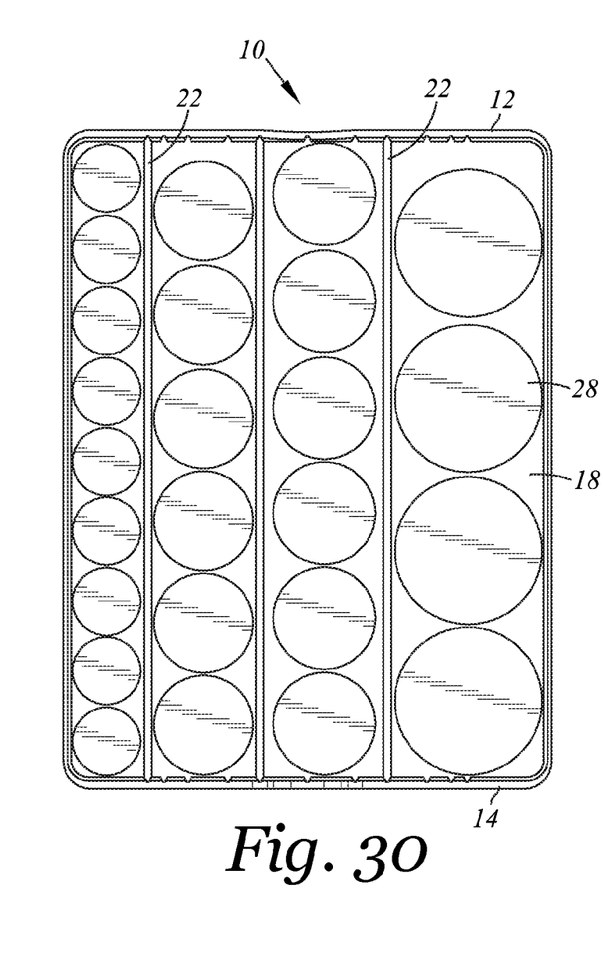
FIG. 30 is a top plan view of a tray with four dividers defining rows of four different widths.

FIG. 30 shows a tray 10 with four rows of different sized pods. The spacing between adjacent dividers 22 is about 4 cm for the first, end row containing the NESPRESSO® capsules, about 5 cm for the second and third (middle) rows, and about 6 cm for the end row containing the largest TASSIMO® T-DISC® coffee pods.

The tray 10 has the end walls 12, 14 and side walls 16 about the same height as or slightly higher than these coffee pods 28 (with two T-DISC® coffee pods stacked on top of each other). That allows the tray 1 to be inserted into and removed from the housing (not shown). Because the tray 10 is lightweight, it may be easily removed from the housing and the drawer (not shown) into which the tray may be placed during use. Because the tray dividers 10 are readily removed the tray 10 may be easily cleaned and the dividers reconfigured to accommodate different coffee pods 28.

The tray 10 and dividers 22 are preferably made of molded plastic, such as resin, but other plastics are believed suitable, preferably injection moldable plastics and the tray is preferably injection molded to form a single piece structure, as are each of the dividers 22. The tray is preferably transparent or translucent. The tray 10 may be used by itself, but is preferably placed within an enclosing structure such as a wire drawer (not shown) configured to slide in and out of one side of a housing (not shown) having a sturdy top (not shown) onto which a coffee maker or other item may be placed. The wire drawer preferably conforms to the shape of the tray 10 and vice versa, preferably but optionally, including conforming to the shape of recess. Thus, the wire drawer has a wire member along the upper and lower edges of the side walls 16, and along the upper and lower edges of the end walls 12, 14 to form a rectangular enclosure with an open top. The wire drawer (not shown) has one or more members extending parallel to axis 26 between the front and rear end walls to form a bottom support on which the tray 10 rests during use, but the bottom support could extend laterally between the sides of the wire drawer. The housing typically has four vertical legs with a supporting frame to enclose the drawer and configured to allow the drawer to slide in and out of the housing. The top is supported by the vertical legs, although the legs could be replaced by sufficiently strong side walls or a front and back wall.

The above description is given by way of example, and not limitation. Given the above disclosure, one skilled in the art could devise variations that are within the scope and spirit of the invention disclosed herein, including various sectional shapes of the divider 22. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A tray, comprising:
a rectangular body having first and second opposing end walls joined to two opposing sidewalls with a closed bottom and an open top, the first end wall having a plurality of first slots at predetermined locations and the second end wall having a plurality of second slots at predetermined locations, the first and second plurality of slots being aligned with each other to form pairs of corresponding slots so a divider placed into corresponding first and second slots is generally parallel to a longitudinal axis of the tray, the slots having a top end adjacent the open top of the tray and a bottom end adjacent the closed bottom of the tray, the slots in the first and second plurality of slots having a width measured generally parallel to the bottom of the tray and perpendicular to the longitudinal axis, with the width being larger at the bottom than at the top, each slot having two opposing slot side walls that are straight and inclined to each other and continuous from the top end of the slot to the bottom of the slot; and a plurality of generally rectangular dividers having a length slightly greater than a distance between the interior surfaces of the opposing end walls and selected to fit into two aligned and corresponding slots, the opposing slot sidewalls of each aligned and corresponding slot defining a space between them that is open so the divider can move between the opposing slot sidewalls.

2. The tray of claim 1, wherein the slots in the first and second plurality of slots extend into the respective end wall a depth that increases as each slot approaches the bottom of the tray.

3. The tray of claim 2, wherein the plurality of dividers have opposing ends that are tapered to fit within respective ones of the first and second plurality of the slots.

4. The tray of claim 2, wherein the bottom of the tray has a plurality of grooves generally parallel to the longitudinal axis, each groove extending along the bottom between a different pair of said aligned and corresponding slots.

5. The tray of claim 4, wherein the plurality of dividers have a bottom edge that is tapered to fit into the grooves.

6. The tray of claim 2, wherein the tray has two of the plurality of dividers each placed into one of the pair of corresponding and aligned slots located so that the those two dividers and side walls define three rows parallel to the longitudinal axis, the rows having a width of about 6 cm each.

7. The tray of claim 2, wherein the plurality of dividers comprises only four dividers each placed into a different one of the pairs of corresponding and aligned slots located so that the dividers and side walls define five rows parallel to the longitudinal axis, the rows having a width of about 5 cm each.

8. The tray of claim 2, wherein the plurality of dividers comprises only five dividers each placed into corresponding and aligned slots located so that the dividers and side walls define six rows parallel to the longitudinal axis, the rows having a width of about 4 cm each.

9. The tray of claim 2, wherein the plurality of dividers comprises three dividers each placed into corresponding and aligned slots located so that the dividers and side walls define four rows parallel to the longitudinal axis, the rows comprising a first row having a width of about 6 cm, a second row of the four rows having a width of about 5 cm, a third row of the four rows having a width of about 4 cm and a fifth row having a width of about 5 cm.

10. The tray of claim 1, wherein the pairs of corresponding slots includes eleven pairs of corresponding slots with the first pair of corresponding slots located on the longitudinal axis extending through a middle of the opposing end walls, with the second and third pairs of corresponding slots located on opposing sides of the longitudinal axis at a distance of about 1 cm from the longitudinal axis, with the fourth and fifth pairs of corresponding slots located on opposing sides of the longitudinal axis at a distance of about 4.3 cm from the longitudinal axis, with the sixth and seventh pairs of corresponding slots located on opposing sides of the longitudinal axis at a distance of about 6.3 cm from the longitudinal axis, with the eighth and ninth pairs of corresponding slots located on opposing sides of the longitudinal axis at a distance of about 7.6 cm from the longitudinal axis and with the tenth and eleventh pairs of corresponding slots located on opposing sides of the longitudinal axis at a distance of about 8.5 cm.

11. The tray of claim 1, wherein the slot has the shape of an isosceles triangle.

12. The tray of claim 1, wherein the slot has a width between the inclined slot sidewalls which width increases at a constant rate from the top end to the bottom end of the slot.

13. A kit for a coffee pod tray, comprising:

a rectangular tray having first and second opposing end walls joined to two opposing sidewalls with a closed bottom and an open top, the first end wall having a plurality of first slots at predetermined locations and the second end wall having a plurality of second slots at predetermined locations, the first and second plurality of slots being aligned with each other to form pairs of corresponding slots so a divider placed into corresponding first and second slots is generally parallel to a longitudinal axis of the tray, the slots having a top end adjacent the open top of the tray and a bottom end adjacent the closed bottom of the tray, the slots in the first and second plurality of slots having a width measured generally parallel to the bottom of the tray and perpendicular to the longitudinal axis, with the width being larger at the bottom than at the top, each slot having opposing slot walls that are straight and inclined to each other and continuous from the top end of the slot to the bottom of the slot; and from two to six generally rectangular dividers each having a length slightly greater than a distance between the interior surfaces of the opposing end walls and selected to fit into two aligned and corresponding slots.

14. The kit of claim 13, wherein the slots in the first and second plurality of slots extend into the respective end wall a depth that increases as the slot approaches the bottom of the tray.

15. The kit of claim 13, wherein the dividers have opposing ends that are tapered to fit within the respective one of the first and second plurality of slots.

16. The kit of claim 13, wherein the bottom of the tray on the inside of the tray has a plurality of grooves generally parallel to the longitudinal axis, each groove extending along the bottom between a respective pair of said aligned and corresponding slots.

17. The kit of claim 16, wherein the dividers have a bottom edge that is tapered to fit into the grooves.

18. The kit of claim 16, wherein the bottom of the tray on the outside of the tray has a plurality of ribs with each rib of the plurality of ribs aligned with a respective groove so the plurality of ribs strengthen the grooves.

19. The kit of claim 13, wherein the pairs of corresponding slots includes eleven pairs of corresponding slots with the first pair of corresponding slots is located on the longitudinal axis extending through a middle of the opposing end walls, with the second and third pairs of corresponding slots located on opposing sides of the longitudinal axis at a distance of about one inch mm from the longitudinal axis, with the fourth and fifth pairs of corresponding slots located on opposing sides of the longitudinal axis at a distance of about 4.3 cm from the longitudinal axis, with the sixth and seventh pairs of corresponding slots located on opposing sides of the longitudinal axis at a distance of about 6.4 cm from the longitudinal axis, with the eighth and ninth pairs of corresponding slots located on opposing sides of the longitudinal axis at a distance of about 7.6 cm from the longitudinal axis, and the tenth and eleventh pairs of corresponding slots located on opposing sides of the longitudinal axis at a distance of about 8.5 cm.

20. The kit of claim 13, wherein the plurality of dividers includes only five dividers.

21. The kit of claim 15, wherein the plurality of dividers includes only four dividers.

22. The kit of claim 19, wherein the plurality of dividers has only five dividers.

23. The tray of claim 13, wherein the slot has the shape of an isosceles triangle.

24. The tray of claim 13, wherein the slot has a width between the inclined slot sidewalls which width increases at a constant rate from the top end to the bottom end of the slot.

\* \* \* \* \*